(12) United States Patent
Mieda et al.

(10) Patent No.: US 11,823,816 B2
(45) Date of Patent: Nov. 21, 2023

(54) INSULATING TAPE FOR COATING CONNECTION PORTION OF POWER CABLE, METHOD FOR FORMING INSULATING COATING ON EXTERIOR SURFACE OF CONNECTION PORTION OF POWER CABLE, AND POWER CABLE

(71) Applicant: FURUKAWA ELECTRIC CO., LTD., Tokyo (JP)

(72) Inventors: Tetsuya Mieda, Tokyo (JP); Takahiro Kanaya, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/599,164

(22) PCT Filed: Mar. 30, 2020

(86) PCT No.: PCT/JP2020/014713
§ 371 (c)(1),
(2) Date: Sep. 28, 2021

(87) PCT Pub. No.: WO2020/204013
PCT Pub. Date: Oct. 8, 2020

(65) Prior Publication Data
US 2022/0157486 A1    May 19, 2022

(30) Foreign Application Priority Data
Mar. 29, 2019    (JP) .................................. 2019-069323

(51) Int. Cl.
*H01B 9/02* (2006.01)
*H01B 3/30* (2006.01)
(Continued)

(52) U.S. Cl.
CPC ............... *H01B 3/30* (2013.01); *H01B 9/023* (2013.01); *H01B 17/56* (2013.01); *H02G 1/14* (2013.01); *H02G 15/08* (2013.01)

(58) Field of Classification Search
CPC ... H01B 3/02; H01B 3/04; H01B 3/44; H01B 3/441; H01B 7/02; H01B 7/04;
(Continued)

(56) References Cited

U.S. PATENT DOCUMENTS

| | | | | |
|---|---|---|---|---|
| 4,520,230 A | * | 5/1985 | Uesugi | ................... H01B 3/441 174/120 SR |
| 4,732,722 A | | 3/1988 | Aida et al. | |

(Continued)

FOREIGN PATENT DOCUMENTS

| | | |
|---|---|---|
| CN | 102725344 A | 10/2012 |
| CN | 107112089 A | 8/2017 |

(Continued)

OTHER PUBLICATIONS

Indian Office Action dated Jun. 7, 2022 in Indian Patent Application No. 202127048644, 6 pages.
(Continued)

*Primary Examiner* — William H. Mayo, III
(74) *Attorney, Agent, or Firm* — Oblon, McClelland, Maier & Neustadt, L.L.P.

(57) ABSTRACT

An insulating tape, for coating a connection portion of a power cable, includes a resin material which includes polyethylene at least partially modified by a molecule imparting hydrophilicity, an antioxidant, and a crosslinking agent. The antioxidant has a molecular weight in a range of 190 or more and less than 1050. The antioxidant has a content in a range of 0.05 parts by mass or more and 0.8 parts by mass or less, (Continued)

with respect to 100 parts by mass of the polyethylene. The insulating tape has a thickness in a range of 50 μm or more and 250 μm or less.

11 Claims, 3 Drawing Sheets

(51) Int. Cl.
　　*H01B 17/56*　　　(2006.01)
　　*H02G 1/14*　　　(2006.01)
　　*H02G 15/08*　　　(2006.01)
(58) Field of Classification Search
　　CPC . H01B 9/02; H01B 9/027; H01B 9/04; H01B 9/06; H01B 9/08; H01B 9/10; H01B 11/02; H01B 11/04; C08L 23/06; C08L 2203/202; C08L 2205/025; C08L 2207/066; C08L 2312/00; H02G 15/18
　　USPC ....... 174/74 R, 84 R, 84 C, 102 R, 103, 108, 174/109, 110 R, 110 PM, 120 R, 120 SC
　　See application file for complete search history.

(56) References Cited

U.S. PATENT DOCUMENTS

| | | | | |
|---|---|---|---|---|
| 5,187,009 | A * | 2/1993 | Kimura | H02G 15/003 |
| | | | | 526/240 |
| 5,231,249 | A * | 7/1993 | Kimura | H02G 15/103 |
| | | | | 174/75 C |
| 10,752,758 | B2 * | 8/2020 | Mohri | C08L 23/06 |
| 2013/0211008 | A1 * | 8/2013 | Shirodkar | C08J 5/18 |
| | | | | 525/232 |
| 2013/0211009 | A1 * | 8/2013 | Yang | C08L 23/24 |
| | | | | 526/324 |
| 2013/0216812 | A1 * | 8/2013 | Cheng | C08L 23/0815 |
| | | | | 525/232 |
| 2013/0224463 | A1 * | 8/2013 | Shirodkar | C08L 23/08 |
| | | | | 525/232 |
| 2014/0155553 | A1 * | 6/2014 | Shirodkar | C08L 23/0815 |
| | | | | 525/240 |
| 2016/0243799 | A1 * | 8/2016 | Oshima | B32B 27/08 |
| 2016/0272798 | A1 * | 9/2016 | Cheng | C08F 236/20 |
| 2017/0330645 | A1 | 11/2017 | Yamazaki et al. | |
| 2018/0218804 | A1 | 8/2018 | Yamazaki et al. | |
| 2019/0375925 | A1 | 12/2019 | Mohri et al. | |

FOREIGN PATENT DOCUMENTS

| | | | |
|---|---|---|---|
| EP | 3 336 858 A1 | 6/2018 | |
| JP | 59-199739 A | 11/1984 | |
| JP | 62-71115 A | 4/1987 | |
| JP | 62-227988 A | 10/1987 | |
| JP | 9-40948 A | 2/1997 | |
| JP | 10-273553 A | 10/1998 | |
| JP | 10-283851 A | 10/1998 | |
| JP | 2008-150144 A | 7/2008 | |
| JP | 2013-26048 A | 2/2013 | |
| JP | 2013-026048 A * | 2/2013 | ............... H01B 9/00 |
| JP | 6205032 B1 | 9/2017 | |
| JP | 2018-24740 A | 2/2018 | |
| JP | WO 2018/030160 A1 * | 2/2018 | ............... H01B 9/00 |
| WO | WO 2011/093211 A1 | 8/2011 | |
| WO | WO 2018/030160 A1 | 2/2018 | |

OTHER PUBLICATIONS

Extended European Search Report dated Oct. 7, 2022 in European Patent Application No. 20782222.2, 7 pages.
Combined Chinese Office Action and Search Report dated Nov. 2, 2022 in Patent Application No. 202080022288.6 (with English machine translation and English translation of Category of Cited Documents), 16 pages.
International Search Report dated Jun. 2, 2020 in PCT/JP2020/014713 filed on Mar. 30, 2020, 2 pages.
Notice of Reasons for Refusal dated Sep. 29, 2020 in Japanese Patent Application No. 2020-544681 (with English translation), 9 pages.
Fukuda, T., "Water treeing prevention material for CV cable green body," The Journal of the Institute of Electrical Engineers of Japan, vol. 108, No. 5, 1988, pp. 389-396.
Office Action dated Apr. 18, 2023, issued in corresponding Korean patent application No. 10-2021-7030953 (with machine translation).
Office Action dated Jun. 3, 2023, issued in corresponding Chinese patent application No. 202080022288.6 (with machine translation).

* cited by examiner

INSULATING TAPE FOR COATING CONNECTION PORTION OF POWER CABLE, METHOD FOR FORMING INSULATING COATING ON EXTERIOR SURFACE OF CONNECTION PORTION OF POWER CABLE, AND POWER CABLE

TECHNICAL FIELD

The present invention relates to an insulating tape used for coating a connection portion of a power cable, a method for forming an insulating coating on an outer surface of the connection portion of a power cable using the insulating tape, and a power cable having an insulating coating formed using the insulating tape.

BACKGROUND ART

As a power transmission/distribution cable, CV cables are widely used. Conductors of such CV cables are coated by extrusion molding a resin material on the conductors, the resin material containing crosslinked polyethylene as an insulator to coat the periphery of the conductors. Connection portions of these CV cables are constituted by welding end portions in which conductors are exposed to connect with each other, and then forming an internal semiconductive layer, an insulating layer, an external semiconductive layer, etc. on the conductor, similarly to normal cable portions. Among these, as a method for forming an insulating layer, a method of forming an insulating coating by winding an insulating tape made of the same resin as that of the insulating layer of the cable portion may be mentioned.

Since these CV cables are used for a long period of time, it is required that dielectric breakdown does not occur due to deterioration of resin. Herein, as a cause of the dielectric breakdown, there may be mentioned a water tree occurring in the insulating layer. Water treeing is a phenomenon in which a deterioration site in the resin spreads in a dendritic shape starting from a void or foreign matter present in the insulating layer of the CV cable, and this deterioration site spreading causes dielectric breakdown.

Water trees are considered to occur as follows: when electricity is conducted through the CV cable, water molecules contained in crosslinked polyethylene move and gather at a singular point such as a foreign matter or void, this causes corona discharge. Therefore, in order to suppress a water tree, research has been made from the following viewpoints: (a) to prevent intrusion of moisture, (b) to prevent the occurrence of a foreign matter or void to serve as a singular point, (c) to prevent condensation of water at a singular point, and (d) to increase the strength of crosslinked polyethylene, and the like.

Among these, as a method for preventing water from condensing at a singular point, a method has been proposed in which water condensation at a singular point is suppressed by enhancing hydrophilicity of the polyethylene resin by an additive, so that growth of a water tree is suppressed. For example, Non-Patent Document 1 describes a method of adding to a crosslinkable polyethylene resin (XLPE) an additive having a linear chain having good compatibility with XLPE and having a hydrophilic group capable of bonding with water.

On the other hand, if an attempt is made to increase the hydrophilicity of the polyethylene to prevent water treeing, the affinity of the additive to the polyethylene decreases, so that bleeding-out whereby an additive seep out of polyethylene with time tends to occur. In particular, in the insulating tape to be wound around a connection portion of the power cable, bleeding-out onto the resin surface is significant, due to a large ratio of the surface area to the volume.

The additive that seeps out due to such bleeding-out often includes an antioxidant. Given the above, in order to reduce bleeding-out of an antioxidant from polyethylene, it has been studied to use an antioxidant having a large molecular volume and low mobility in an inside of the resin. As an example thereof, Patent Document 1 discloses as an antioxidant excellent in heat resistance and also excellent in bleeding out resistance, a bleeding-resistant antioxidant comprising a p-phenylphenolic cyclic compound, which is a polycyclic compound. As an antioxidant capable of reducing bleeding-out onto a surface during long-term use of the molded article, Patent Document 2 discloses a polymer type antioxidant having a hindered phenol at a terminal of a polycarbonate molecule.

Patent Document 1: Japanese Unexamined Patent Application, Publication No. S62-227988
Patent Document 2: Japanese Unexamined Patent Application, Publication No. H09-040948
Non-Patent Document 1: Teruo Fukuda, "Water Treeing Inhibiting Material in CV Cable Insulator", Journal of the Institute of Electrical Engineers of Japan, Vol. 108, No. 5, 1988, pp. 389-396

DISCLOSURE OF THE INVENTION

Problems to be Solved by the Invention

In a case in which polyethylene is crosslinked by heating, when an additive is seeped out on the surface of the polyethylene due to bleeding-out, the additive remaining on the surface of the resin inhibits the polyethylene from fusing or crosslinking, and thus local cracking occurs in the fused portion of the polyethylene. Such local cracking particularly easily occurred when the antioxidant seeped out.

In particular, in a case in which an insulating tape made of a resin fabricated into a form of a tape was wound around a connection portion of power cable to form an insulating coating, such local cracking easily occurred in the insulating coating obtained after crosslinking. For example, a winding device 2 shown in FIGS. 2A and 2B is a device to wind an insulating tape 20 around a conductor, by passing the insulating tape 20 drawn from a reel 21 through a tape guide 22 of the winding device 2 attached to a periphery of a conductor 11, and then revolving the winding device 2 around the conductor 11 of the winding device 2. In this winding device 2, the additive bled out onto the surface of the insulating tape 20 was scraped by the tape guide 22 and accumulated thereon, and then collectively transferred to the surface of the insulating tape 20. This resulted in a portion in which a significant amount of the additive locally adhered, thereby causing local cracking in the obtained insulating coating.

Herein, although the additive (antioxidant) bled out onto the surface of the polyethylene may be reabsorbed in some cases by the polyethylene by heating during crosslinking, when an antioxidant of a polymer type as described in Patent Documents 1 and 2 was used, the additive was hardly reabsorbed by the polyethylene by heating during crosslinking. As such, local cracking occurred by the antioxidant remaining on the surface.

An object of the present invention is to provide an insulating tape which can suppressing a non-fusion portion from occurring, even when an insulating coating of the power cable is formed using a resin material containing polyethylene with high hydrophilicity, and which can suppress local cracking in an inside of the insulating coating from easily occurring; a method for forming an insulating coating on an outer surface of the connection portion of the power cable; and a power cable.

Means for Solving the Problems

As a result of extensive research, the present inventors have found that, in order to suppress cracking due to non-fusion in the insulating layer, it is effective to blend a low molecular weight additive which is easily reabsorbed by the resin material, though such an additive can easily move in the resin material and easily bleed out, rather than to blend a high molecular weight additive (antioxidant) which does not easily move in the resin material. In particular, the present inventors have found that when an antioxidant having a molecular weight of 190 or more and less than 1050 is used and additionally the content of the antioxidant is set to within a predetermined range, the antioxidant bled out onto the surface of the insulating tape is reabsorbed by the polyethylene, due to heating to crosslink the polyethylene, or preheating performed before the crosslinking, and have completed the present invention based on such findings.

That is, the gist of the configuration of the present invention is as follows.

A first aspect of the present invention relates to an insulating tape for coating a connection portion of a power cable, including a resin material including polyethylene at least partially modified by a molecule imparting hydrophilicity, an antioxidant, and a crosslinking agent, in which the antioxidant has a molecular weight in a range of 190 or more and less than 1050, and a content of the antioxidant is in a range of 0.05 parts by mass or more and 0.8 parts by mass or less with respect to 100 parts by mass of the polyethylene, and a tape thickness is in a range of 50 µm or more and 250 µm or less.

A second aspect of the present invention relates to the insulating tape for coating a connection portion of a power cable as described in the first aspect, in which the molecule imparting hydrophilicity is at least one selected from the group consisting of unsaturated dicarboxylic acids, anhydrides of unsaturated dicarboxylic acids, and derivatives of unsaturated dicarboxylic acids.

A third aspect of the present invention relates to a method for forming an insulating coating on an outer surface of a connection portion of a power cable, including: a tape winding step of winding the insulating tape as described in the first or second aspect around an outer periphery of a connection portion in which end portions of a plurality of power cables whose conductors are exposed are conductor-connected to each other, to form an insulating coating on the outer surface of the connection portion; and a crosslinking step of crosslinking the polyethylene in the insulating coating by subjecting the connection portion having the insulating coating formed thereon to pressurizing and heating treatment of 300 kPa or more and 1,000 kPa or less at a temperature of 140° C. or more and 280° C. or less.

A fourth aspect of the present invention relates to the method for forming an insulating coating on an outer surface of a connection portion of a power cable as described in the third aspect, in which in the tape winding step, a winding device having a tape guide for guiding the insulating tape to a winding position on the outer surface of the connection portion is used, and the tape winding is performed while controlling a surface temperature of the tape guide during winding the insulating tape to 30° C. or less.

A fifth aspect of the present invention relates to the method for forming an insulating coating on an outer surface of a connection portion of a power cable as described in the third or fourth aspect, the method further including a preheating step of heating the connection portion, around which the insulation coating is formed, at 40° C. or more and 130° C. or less after the tape winding step and before the crosslinking step.

A sixth aspect of the present invention relates to a power cable, including a connecting structure portion including a connection portion in which end portions of a plurality of power cables whose conductors are exposed are conductor-connected to each other, and an insulating coating formed around an outer periphery of the connection portion by at least winding the insulating tape as described in the first or second aspect around the outer periphery of the connection portion and performing crosslinking.

Effects of the Invention

According to the present invention, polyethylene having high hydrophilicity is used in order to suppress occurrence of water trees, and even when an antioxidant bleeds out on the surface of the resin material, the antioxidant is dissolved again in the resin material during crosslinking and is not left between layers of the insulating tape insulating tapes. Therefore, fusing or crosslinking of the insulating coating formed by winding the insulating tape is not prevented. Thereby, it is possible to obtain an insulating tape for coating a connection portion of a power cable in which local cracking to the fused portions does not easily occur, and which has durability to withstand long-term use in the CV cable; a method for forming an insulating coating using the same; and a power cable using the same.

BRIEF DESCRIPTION OF THE DRAWINGS

Of these, FIG. 1A is a cross-sectional view showing end portions of two power cables in a separated state, the end portions whose conductors are exposed being disposed facing each other;

FIG. 1B is a cross-sectional view showing a state in which the end portions whose conductors are exposed are conductor-connected to each other;

FIG. 1C is a cross-sectional view showing a state in which an internal semiconductive layer is formed around the outer periphery of the connection portion;

FIG. 1D is a cross-sectional view showing a state in which an insulating coating is formed by winding the insulating tape around the outer periphery of the internal semiconductive layer of the connection portion; and FIG. 1E is a cross-sectional view showing a state in which an external semiconductive layer is formed around the outer periphery of the insulating tape.

Of these, FIG. 2A is a perspective view schematically showing the power cable and the winding device; and FIG. 2B is a cross-sectional view schematically showing the power cable and the winding device.

Of these, FIG. 3A is a cross-sectional view schematically showing the structure of the power cable and the connection portion thereof;

FIG. 3B is a cross-sectional view taken along line A-A' in FIG. 3A; and

FIG. 3C is a cross-sectional view taken along line B-B' of FIG. 3A.

PREFERRED MODE FOR CARRYING OUT THE INVENTION

Figure 1A:
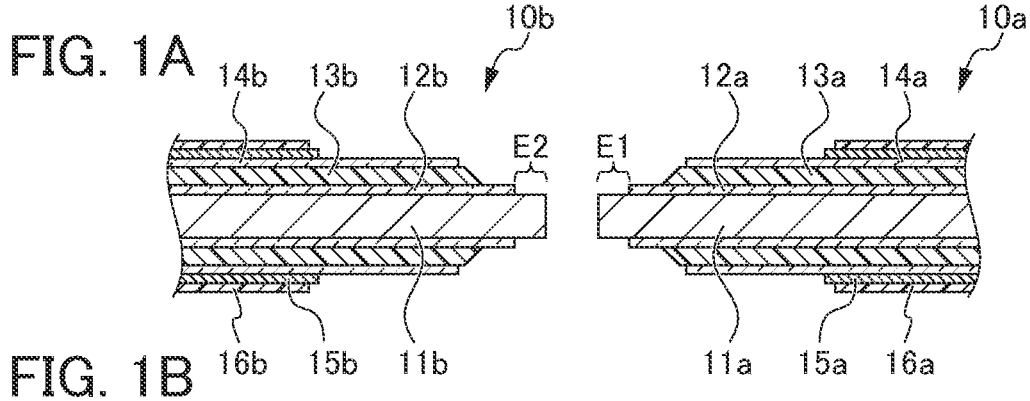
FIGS. 1A to 1E are drawings illustrating a method for forming an insulating coating on the outer surface of the connection portion of the power cable according to the present invention.

Hereinafter, embodiments of the present invention will be described in detail. Note that the present invention is not limited to the present embodiment but various modifications are possible within a scope in which the content of the present invention is not changed.

<Insulating Tape for Coating Connection Portion of Power Cable>

The insulating tape for coating a connection portion of a power cable of the present invention is made of a resin material including a polyethylene (A) at least partially modified by a molecule imparting hydrophilicity, an antioxidant (B), and a crosslinking agent (C). The molecular weight of the antioxidant (B) is in a range of 190 or more and less than 1050, and the content of the antioxidant (B) is in a range of 0.05 parts by mass or more and 0.8 parts by mass or less with respect to 100 parts by mass of the polyethylene (A), and the tape thickness is in a range of 50 μm or more and 250 μm or less.

According to the insulating tape for coating a connection portion of a power cable according to the present embodiment (hereinafter, sometimes referred to as "insulating tape"), even when polyethylene with high hydrophilicity is used to suppress occurrence of a water tree, the antioxidant bled out onto the surface of the insulating tape is reabsorbed by the polyethylene by heating for crosslinking the polyethylene, and therefore it is possible to make it difficult to cause local cracking to the fused portion. Further, by performing preheating before crosslinking, if necessary, it is possible to promote reabsorption of the antioxidant by the polyethylene and to make it more difficult for local cracking to the fused portion to occur.

[Resin Material]

The resin material constituting the insulating tape includes polyethylene (A), an antioxidant (B), and a crosslinking agent (C).

(Polyethylene (A))

As the polyethylene (A), polyethylene at least a part of which is modified by a molecule imparting hydrophilicity is used. More specifically, either only polyethylene (A1) modified by a molecule imparting hydrophilicity or a combination of the modified polyethylene (A1) and unmodified polyethylene (A2) may be used. Thus, since the resin material can be provided with high hydrophilicity, it is possible to suppress the occurrence of a water tree into the insulating layer formed by the insulating tape.

Of these, the modified polyethylene (A1) is polyethylene modified by linking a molecule containing a hydrophilic group. By using such modified polyethylene (A1), it is possible to suppress accumulation of space charge of direct current, thereby reducing dielectric breakdown in the insulating coating formed by the insulating tape.

Herein, examples of the molecule containing a hydrophilic group include ethers, alcohols, esters, carboxylic acids, etc. Among them, the molecule containing a hydrophilic group is preferably at least one selected from the group consisting of unsaturated dicarboxylic acids, anhydrides of unsaturated dicarboxylic acids, and derivatives of unsaturated dicarboxylic acids.

Among the molecules containing a hydrophilic group, examples of the unsaturated dicarboxylic acids include maleic acid, fumaric acid, itaconic acid, etc. Further, examples of the anhydrides of unsaturated dicarboxylic acids include maleic anhydride, itaconic acid anhydride, etc. Further, examples of derivatives of unsaturated dicarboxylic acids include monomethyl esters, monoethyl esters, diethyl esters, amides, imides, etc. of unsaturated dicarboxylic acids. Of these, it is most preferable to use maleic anhydride, because maleic anhydride has the highest ratio of carbonyl groups per molecular weight and addition of a small amount thereof enables hydrophilicity to be imparted to polyethylene.

On the other hand, it is preferable that polyethylene before being modified with a molecule having a hydrophilic group contains a low-density polyethylene which is polyethylene having a branched structure and having a specific gravity of 0.900 or more and 0.940 or less, or a copolymer of a linear low-density polyethylene and an alkene. By using such a low-density polyethylene, since the flexibility of the insulating tape is increased, it is possible to easily perform the winding around the power cable. Further, the melting point of the low-density polyethylene is preferably 90° C. or more and 130° C. or less, and more preferably 100° C. or more and 120° C. or less.

Note that "melting point" in this specification is a melting point measured by a differential scanning calorimetry method of JIS K7121-1987.

As the modified polyethylene (A1), in addition to those obtained by modifying polyethylene as described above, a commercially available resin can be used. For example, Himilan (ethylene-methacrylic acid copolymer, manufactured by DuPont-Mitsui Polychemicals Co., Ltd.), Nucrel (ethylene-methacrylic acid copolymer, manufactured by DuPont Co., Ltd.), SCONA TSPE (maleic anhydride-modified low-density polyethylene, manufactured by BYK Co., Ltd.), Olevac G (maleic anhydride-modified low-density polyethylene, manufactured by Arkema S. A.), Modic (maleic anhydride-modified low-density polyethylene, manufactured by Mitsubishi Chemicals Inc.) and the like can be suitably used.

The specific gravity of the modified polyethylene (A1) is preferably 0.890 or more and 0.950 or less, more preferably 0.900 or more and 0.940 or less, and most preferably 0.910 or more and 0.930 or less. Further, the melting point of the modified polyethylene (A1) is preferably 90° C. or more and less than 135° C., and more preferably 100° C. or more and 120° C. or less.

On the other hand, it is preferable that the unmodified polyethylene (A2) contains a low-density polyethylene which is polyethylene having a branched structure and having a specific gravity of 0.900 or more and 0.940 or less, or a copolymer of a linear low-density polyethylene and an alkene. When low-density polyethylene is included as the unmodified polyethylene (A2), the flexibility of the insulating tape is increased, and it is, therefore, possible to easily perform the winding around the power cable.

The specific gravity of the unmodified polyethylene (A2) is preferably 0.900 or more and 0.940 or less, and more preferably 0.910 or more and 0.930 or less. Further, the melting point of the unmodified polyethylene (A2) is preferably 90° C. or more and 130° C. or less, and more preferably 100° C. or more and 120° C. or less.

With respect to the ratio of the modified polyethylene (A1) and the unmodified polyethylene (A2) constituting the polyethylene (A), the whole amount of the polyethylene (A) may be the modified polyethylene (A1). However, from the viewpoint of easy work operations such as kneading with an additive and appropriate adjustment of the concentration of the hydrophilic group, it is preferable to blend the unmodified polyethylene (A2) in a ratio of 2 parts by mass or more and 20 parts by mass or less with respect to 1 part by mass of the modified polyethylene (A1).

(Antioxidant (B))

The antioxidant (B), also referred to as an anti-aging agent, has an effect of preventing an insulating tape or an insulating coating formed by the insulating tape from deteriorating due to heat or oxygen in the air, and an antioxidant having a molecular weight of 190 or more and less than 1050 is used.

Herein, by using an antioxidant having a molecular weight of 190 or more as the antioxidant (B), volatilization of the antioxidant into the atmosphere is suppressed when the resin material is melt-kneaded, so that an amount of the antioxidant to be contained in the insulating tape can be appropriately controlled. Therefore, it is possible to suppress oxidative deterioration of the resin due to heat generation during electricity conduction through the cable, thereby enhancing heat aging resistance and extending the cable life. Therefore, the molecular weight of the antioxidant (B) is preferably 190 or more, more preferably 300 or more, and most preferably 350 or more.

On the other hand, when an antioxidant having a molecular weight of less than 1050 is used as the antioxidant (B), mobility of the antioxidant (B) in the resin material increases, so that the antioxidant (B) tends to bleed out of the resin material. However, even if bled out, the antioxidant having a molecular weight of less than 1050 is easily reabsorbed by the polyethylene by heating during crosslinking, or preheating performed as required before the crosslinking. Thereby, an antioxidant remaining between the layers of the insulating tape when crosslinking the insulating tape wound around the cable can be reduced. Therefore, this makes it possible to suppress occurrence of local cracking to the fused portion of the insulating layer. Therefore, the molecular weight of the antioxidant (B) is preferably less than 1050, more preferably 800 or less, and most preferably 700 or less.

Examples of the antioxidant (B) include antioxidants belonging to one or more types of phenol-based, phosphorus-based, sulfur-based, amine-based, hydrazine-based and amide-based antioxidants, and derivatives thereof. Herein, the derivatives of antioxidants include a chemical species after the above-mentioned antioxidants are oxidized. In particular, it is preferable for the antioxidant (B) to include a phenol-based or amine-based antioxidant and a phosphoric acid-based or sulfur-based antioxidant.

In particular, the phenol-based antioxidant includes preferably a phenol-based antioxidant having a molecular weight of 190 or more, and more preferably a phenol-based antioxidant having a molecular weight of 300 or more. On the other hand, as the phenol-based antioxidant, it is preferable to include a phenol-based antioxidant having a molecular weight of 800 or less, and more preferable to include a phenol-based antioxidant having a molecular weight of 600 or less.

Specific examples of the phenol-based antioxidant include Irganox 245 (ethylene bis(oxyethylene) bis-(3-(5-tert-butyl-4-hydroxy-m-tolyl)propionate), molecular weight 587), Irganox 259 (hexamethylene bis(3-(3,5-di-tert-butyl-4-hydroxyphenyl)propionate), molecular weight 639), Irganox 565 (2,6-di-tert-butyl-4-(4,6-bis(octylthio)-1,3,5-triazin-2-ylamino)phenol, molecular weight 589), Irganox 1035 (thiodiethylene bis[3-(3,5-di-tert-butyl-4-hydroxyphenyl)propionate], molecular weight 643), Irganox 1076 (octadecyl-3-(3,5-di-tert-butyl-4-hydroxyphenyl)-propionate, molecular weight 531), Irganox 1098 (N,N'-hexane-1,6-diylbis(3-(3,5-di-tert-butyl-4-hydroxyphenylpropionamide)), molecular weight 637), Irganox 1222 (hexamethylene bis(3-(3,5-di-tert-butyl-4-hydroxyphenyl) propionate), molecular weight 356), Irganox 1330 (3,3',3'',5,5',5''-hexa-tert-butyl-$\alpha$, $\alpha'$,$\alpha''$-(mesitylene-2,4,6-triyl)tri-p-cresol, molecular weight 775), Irganox 1425 (calcium bis[3,5-di(tert-butyl)-4-hydroxybenzyl(ethoxy) phosphinate], molecular weight 693), Irganox 3114 (1,3,5-tris(3,5-di-tert-butyl-4-hydroxybenzyl)-1,3,5-triazine-2,4,6(1H,3H,5H)-trione, molecular weight 784), Irganox 1520 (4,6-bis(octylthiomethyl)-o-cresol, molecular weight 425), Irganox 1135 (benzenepropanoic acid, 3,5-bis(1,1-dimethyl-ethyl)-4-hydroxy-C7-C9 branched alkyl esters, molecular weight 390), Irganox 1141 (pentaerythritol tetrakis(3-(3,5-di-tert-butyl-4-hydroxyphenyl)propionate), molecular weight 346), (all manufactured by BASF), Sumilizer BHT (butylated Hydroxytoluene, molecular weight 220), Sumilizer MDP-S (2,2'-methylenebis(4-methyl-6-tert-butylphenol), molecular weight 341), Sumilizer GA-80 (3,9-bis{2-[3-(3-tert-butyl-4-hydroxy-5-methylphenyl)-propionyloxy]-1,1-dimethylethyl}-2,4,8,10-tetraoxaspiro[5.5]undecane, molecular weight 741), Sumilizer BBM-S (4,4'-butylidenebis(6-tert-butyl-3-methylphenol), molecular weight 383), Sumilizer WX-R (4,4'-thiobis(2-tert-butyl-5-methylphenol), molecular weight 358), Sumilizer GM ((2-tert-butyl-6-(3-tert-butyl-2-hydroxy-5-methylbenzyl)-4-methylphenyl acrylate), molecular weight 395), (all manufactured by Sumitomo Chemical Company Limited), Adeka Stab AO-20 (1,3,5-tris (3,5-di-tert-butyl-4-hydroxybenzyl)-1,3,5-triazine-2,4,6 (1H,3H,5H)-trione, molecular weight 784), Adeka Stab AO-30 (4,4',4''-(1-methylpropanyl-3-ylidene)tris(6-tert-butyl-m-cresol), molecular weight 545), Adeka Stab AO-40 (6,6'-di-tert-butyl-4,4'-butylidenedi-m-cresol, molecular weight 383), Adeka Stab AO-50 (Octadecyl 3-(3,5-di-tert-butyl-4-hydroxyphenyl)propionate, molecular weight 531), Adeka Stab AO-80 (3,9-bis{2-[3-(3-tert-butyl-4-hydroxy-5-methylphenyl)propionyloxy]-1,1-dimethylethyl}-2,4,8,10-tetraoxaspiro[5.5]undecane, molecular weight 741), Adeka Stab AO-330 (1,3,5-tris(3,5-di-tert-butyl-4-hydroxyphenyl-methyl)-2,4,6-trimethylbenzene, molecular weight 775), (all manufactured by Adeka Corporation), Nocrac 300 (4,4'-thiobis(3-methyl-6-t-butylphenol), molecular weight 359, manufactured by Ouchi Shinko Chemical Industrial), and the like.

Further, the phosphoric acid-based antioxidant preferably includes a phosphoric acid-based antioxidant having a molecular weight of 300 or more, and more preferably includes a phosphoric acid-based antioxidant having a molecular weight of 500 or more. On the other hand, as the phosphoric acid-based antioxidant, it is preferable to include a phosphoric acid-based antioxidant having a molecular weight of less than 1050.

Specific examples of the phosphorus-based antioxidant include Irgafos 168 (tris(2,4-di-tert-butylphenyl)phosphite, molecular weight 647), Irgafos P-EPQ (1,1'-biphenyl-4,4'-diylbis(phosphonous acid)tetrakis(2,4-ditert-butylphenyl)

ester, molecular weight 1035), Irgafos 126 (3,9-bis(2,4-di-tert-butylphenyl)-2,4,8,10-tetraoxa-3,9-diphosphaspiro[5.5]undecane, molecular weight 604), (all manufactured by BASF), Sumilizer BBM-S (4,4'-butylidenebis(6-tert-butyl-3-methylphenol), molecular weight 383), (manufactured by Sumitomo Chemical Company Limited), Adeka Stab PEP-4C (bis(nonylphenyl) pentaerythritol diphosphite, molecular weight 633), Adeka Stab PEP-8 (3,9-bis(octadecyloxy)-2,4,8,10-tetraoxa-3,9-diphosphaspiro[5.5]undecane, molecular weight 733), Adeka Stab PEP-36 (3,9-bis(2,6-di-tert-butyl-4-methylphenoxy)-2,4,8,10-tetraoxa-3,9-diphosphaspiro[5.5]undecane, molecular weight 633), Adeka Stab HP-10 (2,2'-methylenebis(4,6-di-tert-butylphenyl) 2-ethylhexyl phosphite, molecular weight 583), Adeka Stab 1178 (Tris(nonylphenyl) phosphite, molecular weight 689), Adeka Stab 2112 (tris(2,4-di-tert-butylphenyl)phosphite, molecular weight 647), Adeka Stab C (2-ethylhexyl diphenyl phosphite, molecular weight 346), Adeka Stab 135 A (isodecyl diphenyl phosphite, molecular weight 374), Adeka Stab 3010 (triisodecyl phosphite, molecular weight 503), (all manufactured by Adeka Corporation), and the like.

Further, as the sulfur-based antioxidant, it is preferable to include a sulfur-based antioxidant having a molecular weight of 300 or more, and more preferably to include a sulfur-based antioxidant having a molecular weight of 400 or more. On the other hand, as the sulfur-based antioxidant, it is preferable to include a sulfur-based antioxidant having a molecular weight of 1000 or less, and more preferable to include a sulfur-based antioxidant having a molecular weight of 800 or less.

Specific examples of the sulfur-based antioxidant include Irganox PS800FL (didodecyl-3,3'-thiodipropionate, molecular weight 515), Irganox PS802FL, (3,3'-thiodipropionic acid dioctadecyl ester, molecular weight 683), (all manufactured by BASF), Sumilizer WX (4,4'-thiobis(2-tert-butyl-5-methylphenol), molecular weight 359) (manufactured by Sumitomo Chemical Company Limited), Adeka Stab AO-503 (di(tridecyl) 3,3'-thiodipropionate, molecular weight 543), Adeka Stab AO-23 (bis[2-methyl-4-{3-n-alkyl (C12 or C14) thiopropionyloxy}-5-tert-butylphenyl]sulfide, molecular weight about 900, manufactured by Adeka Corporation), and the like.

As the antioxidant (B), two or more types of these compounds may be used in combination. Further, other antioxidants having a molecular weight of less than 190 or other antioxidants having a molecular weight of 1050 or more may be used in combination in the antioxidant (B).

Among these antioxidants (B), aromatic compounds are preferred, and a compound having a structure in which one or more branched alkyl groups are bonded to the benzene ring in the molecule is more preferred, and a compound having a structure in which one or more t-butyl groups are bonded to the benzene ring in the molecule is further preferred. When the antioxidant (B) has such a structure, steric hindrance due to the molecule of the antioxidant is moderately large, so that the oxidation reaction rate of the antioxidant (B) can be maintained to a moderate extent.

The lower limit of the total content of the antioxidant (B) in the resin material is 0.05 parts by mass, preferably 0.2 parts by mass, and more preferably 0.3 parts by mass, with respect to 100 parts by mass of the polyethylene (A). Thereby, it is possible to reduce occurrence of scorch when kneading the raw materials for the resin material, and also to enhance heat aging resistance of the insulating layer obtained by crosslinking the insulating tape. On the other hand, the upper limit of the total content of the antioxidant (B) in the resin material is 0.8 parts by mass, and preferably 0.6 parts by mass, with respect to 100 parts by mass of the polyethylene (A). Thereby, it is possible to reduce the amount of moisture generated during resin crosslinking, and also to reduce bleeding from the crosslinked resin.

In addition, it is more preferred for the total content of the antioxidant (B) relative to 100 parts by mass of the crosslinking agent (C) to be 5 parts by mass or more and 50 parts by mass or less.

Note that the antioxidant (B) preferably consists of only an antioxidant having a molecular weight in a range of 190 or more and less than 1050, but may include an antioxidant having a molecular weight outside the above appropriate range as long as the mass ratio occupied by such an antioxidant relative to the entire antioxidant is within 50%. In addition, among the antioxidant having a molecular weight in the range of 190 or more and less than 1050, it is preferred for an antioxidant composed of a polycyclic compound to be present in a small content. Since the polycyclic compound has a large steric hindrance even when the molecular weight is small, when such a polycyclic compound bleeds out from the resin material, it is difficult for the polyethylene to reabsorb even by heating during crosslinking the polyethylene or preheating performed before the crosslinking. Therefore, it is more preferable that the content of the polycyclic compound is within 50% by mass in the antioxidant.

(Crosslinking Agent (C))

The crosslinking agent (C) has an action of enhancing mechanical properties and heat resistance of the resin material by crosslinking the polyethylene (A) and bonding the adjacent insulating tape.

As the crosslinking agent (C), it is preferable to include an organic peroxide which generates radicals by thermal decomposition when heated.

Specific examples of the crosslinking agent (C) include dicumyl peroxide (DCP), benzoyl peroxide, dichlorobenzoyl peroxide, di-tert-butylperoxide, butyl peracetate, tert-butyl perbenzoate, and 2,5-dimethyl-2,5-di(tert-butylperoxy)hexane. Among them, it is preferable for the crosslinking agent (C) to include DCP. Further, as the crosslinking agent (C), two or more of these compounds may be included in combination.

The lower limit of the blending amount of the crosslinking agent (C) is preferably 0.1 parts by mass or more, and more preferably 0.5 parts by mass or more, with respect to 100 parts by mass of the polyethylene (A). Thereby, crosslinking of the polyethylene (A) enhances mechanical properties and heat resistance of the resin material. On the other hand, the upper limit of the blending amount of the crosslinking agent (C) is preferably 5 parts by mass, and more preferably 3 parts by mass, with respect to 100 parts by mass of the polyethylene (A). Thereby, it is possible to suppress decreases in electrical characteristics due to abnormal crosslinking when kneading or extruding the obtained resin material.

(Other Components (D))

The resin material constituting the insulating tape as described in the present embodiment may include other components, as required. For example, various additives such as a moisture absorber, a heat stabilizer, a light stabilizer, a flame retardant, a softener, a filler, a colorant, a solvent, a pigment, a dye, and a fluorophore may be added.

[Properties of Insulating Tape]

The insulating tape as described in the present embodiment is used for coating a connection portion of power cables. More specifically, the insulating tape is used to form an insulating coating by winding around the outer periphery of a connection portion, in which end portions of a plurality of power cables whose conductors are exposed are conductor-connected to each other, to form the insulating coating.

The tape thickness of the insulating tape as described in the present embodiment is preferably 50 μm or more, more preferably 70 μm or more, and most preferably 100 μm or more in order to reduce the number of turns when the insulating tape is wound around the connection portion and in order to improve heat aging resistance of the insulating layer obtained by crosslinking the insulating tape. On the other hand, the upper limit of the tape thickness of the insulating tape is preferably 250 μm or less, and more preferably 150 μm or less, in order to facilitate winding around the connection portion. With respect to the insulating tape as described in the present embodiment, in particular, when the tape thickness is 250 μm or less, and bleeding out to the surface of the resin material easily occurs, the difference in the number of occurrences of resin cracking is significant between a tape in which reabsorption performance is enhanced and a tape in which reabsorption performance is not enhanced.

Further, the tape width of the insulating tape as described in the present embodiment is preferably 5 mm or more and 30 mm or less in order to form a smooth winding surface.

[Manufacturing Method of Insulating Tape]

The method of manufacturing the insulating tape as described in the present embodiment is not particularly limited, and the insulating tape as described in the present embodiment can be produced by a method including, for example, a kneading step of kneading a raw material including a polyethylene (A), an antioxidant (B), and a crosslinking agent (C) described above at a predetermined ratio, and a molding step of extrusion molding the resin kneaded in the kneading step to form a tape.

(Kneading Step)

Here, as the kneading step performed with respect to a raw material for the insulating tape, a step of adding the antioxidant (B) and the crosslinking agent (C) to the polyethylene (A) and then melting and kneading the mixture can be mentioned. The kneading temperature in the kneading step is preferably a temperature higher than the melting point of the polyethylene (A) and equal to or lower than 135° C. More specifically, in order to obtain a uniform paste-like resin material, the kneading temperature is preferably higher than the melting point of polyethylene (A). In addition, in order to avoid crosslinking of the polyethylene (A) due to thermal decomposition of the crosslinking agent (C), the kneading temperature in the kneading step is preferably set to 135° C. or less, and more preferably less than 130° C.

In the kneading step in the present embodiment, it is only necessary to obtain a homogeneous resin material when viewed macroscopically, and in the resin material resulting from the kneading step, a part of the polyethylene (A) may be dispersed in the paste without melting.

In addition, in the kneading step in the present embodiment, in order to prevent the crosslinking agent (C) from thermally degrading due to heat generation during kneading, the following method may be adopted: the polyethylene (A) and the antioxidant (B) are kneaded first and then molded to prepare a pellet; the crosslinking agent (C) is added to the obtained pellet; and the crosslinking agent (C) is melted while stirring the pellet and the crosslinking agent (C), thereby making the polyethylene (A) in the pellet absorb the crosslinking agent (C).

(Molding Step)

As the molding step performed with respect to the resin material obtained by kneading, for example, a method in which a film having a predetermined thickness is formed, and then slit processing is performed so as to have a predetermined tape width can be mentioned. As a means for forming a film from the resin material obtained by kneading, a means of extrusion molding can be used. More specifically, an inflation method, a T-die method, a casting method, a calendar method, etc. can be used and among others, it is preferable to use the inflation method.

Further, the molding temperature in the molding step is preferably higher than the melting point of the polyethylene (A), and molding is preferably carried out at a molding temperature of 135° C. or less. More specifically, from the viewpoint of enabling molding of the resin material, the molding temperature is preferably higher than the melting point of the polyethylene (A). Further, in order to avoid crosslinking of the polyethylene (A) due to thermal decomposition of the crosslinking agent (C), the molding temperature is preferably set to 135° C. or less.

Note that the kneading step and the molding step may not be performed as separate steps, but may be performed, for example, using the same device, in which the raw material for the insulating tape is melt-kneaded and extruded or the raw material for the insulating tape is melted and the melted raw material is extruded.

<Method of Forming Insulating Coating on Outer Surface of Connection Portion of Power Cable>

The method for forming an insulating coating on an outer surface of a connection portion of a power cable as described in the present embodiment includes a tape winding step of winding the above-mentioned insulating tape around the outer periphery of the connection portion in which end portions of a plurality of power cables whose conductors are exposed are conductor-connected to each other to form the insulating coating on the outer surface of the connection portion, and a crosslinking step of crosslinking polyethylene in the insulating coating by subjecting the connection portion having the insulating coating formed thereon to pressurizing and heating treatment at a pressure of 300 kPa or more and 1,000 kPa or less at a temperature of 140° C. or more and 280° C. or less.

By the method for forming an insulating coating as described in the present embodiment, the antioxidant bled out onto the surface of the insulating tape can be reabsorbed by the polyethylene, whereby cracking inside the insulating coating can be suppressed.

FIGS. 1A to 1E are drawings illustrating the method for forming an insulating coating, according to the present invention. FIGS. 1A to 1E are drawings indicating a case in which power cables 10a and 10b are connected, as an example. In the power cable 10a, an internal semiconductive layer 12a, an insulating layer 13a, an external semiconductive layer 14a, a metal shielding layer 15a, and a sheath 16a are stacked in this order around a conductor 11a made of a metal such as copper or aluminum or an alloy. In the power cable 10b, an internal semiconductive layer 12b, an insulating layer 13b, an external semiconductive layer 14b, a metal shielding layer 15b, and a sheath 16b are stacked in this order around a conductor 11b made of the same metal or alloy as the conductor 11b.

(Formation of Connection Portion)

Respective end portions of conductors 11a and 11b of a plurality of power cables 10a and 10b to be connected are exposed, as shown in FIG. 1A. Herein, a total dimension (E1+E2) by which the conductors 11a and 11b should be exposed is preferably greater than a width of the insulating tape, in order to ensure easy winding of the insulating tape.

Herein, when the insulation layers 13a and 13b are made of a resin having high hydrophilicity, particularly, when the insulating layers 13a and 13b are made of a polyethylene resin at least partially modified by a molecule having high hydrophilicity, it is preferable that the insulating layers 13a and 13b are also exposed together with the conductors 11a and 11b. By winding and stacking the insulating tape around the exposed insulating layers 13a and 13b as well, adhesion between the insulating layers 13a and 13b and the insulating tape can be increased, whereby resin cracking in an interface portion can be suppressed.

Figure 1B:
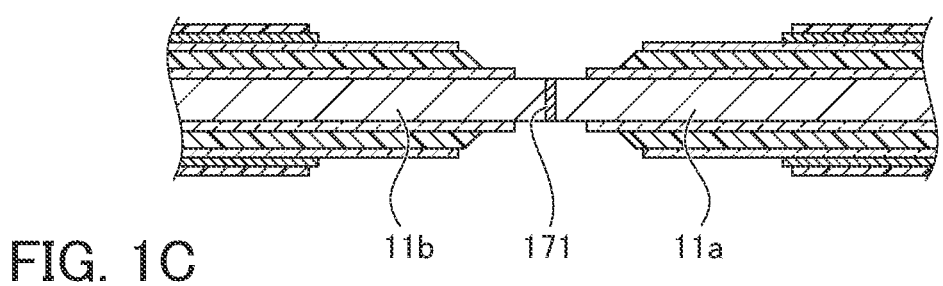

Then, as shown in FIG. 1B, the end portions of the conductors 11a and 11b are conductor-connected to each other. As a method for conductor-connecting, for example, welding can be used, and the connection portion (welded portion) 171 can be formed by the conductor-connection.

(Formation of Internal Semiconductive Layer)

Figure 1C:
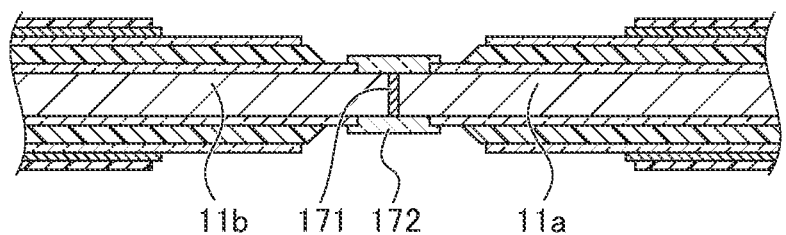

In the outer periphery of the thus-formed connection portion 171, an internal semiconductive layer 172 may be formed, as shown in FIG. 1C. The internal semiconductive layer 172 is formed of a semiconductive resin composition including, for example, a crosslinkable resin, conductive carbon black, an antioxidant, and a crosslinking agent. Among these, examples of the crosslinkable resin include one or more types of resins selected from ethylene-vinyl acetate copolymers, ethylene-methyl acrylate copolymers, ethylene-ethyl acrylate copolymers, and ethylene-butyl acrylate copolymers.

The internal semiconductive layer 172 can be obtained, for example, by molding a resin, more specifically, by extrusion molding a resin on surfaces of the conductors 11a and 11b, by inserting the conductors 11a and 11b into a mold and injecting a resin into the mold, or by molding a resin to a tape shape and winding the tape shape around the surfaces of the conductors 11a and 11b. Further, the internal semiconductive layer 172 may be formed by inserting a heat-shrinkable tube into either the conductor 11a or 11b in advance before forming the connection portion 171, and after the connection portion 171 is formed, heating the tube to shrink the tube.

(Tape Winding Step)

Figure 1D:
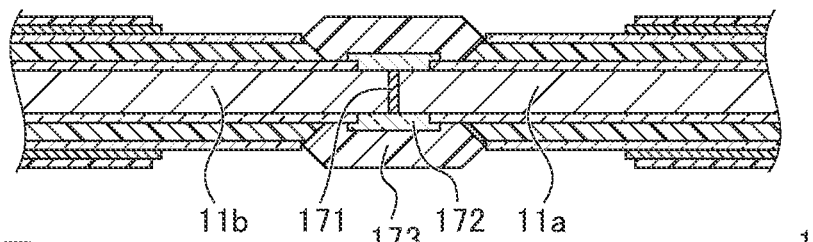

Then, as shown in FIG. 1D, around the outer periphery of the internal semiconductive layer 172 formed around the outer periphery of the connection portion 171 which is formed by conductor-connecting end portions of the plurality of power cables 10a and 10b whose conductors 11a and 11b are exposed, the insulating tape described above is further wound, and thereby the insulating coating 173 is formed over a range covering an entirety of outer peripheries of the connection portion 171 and the internal semiconductive layer 172.

Figure 2A:
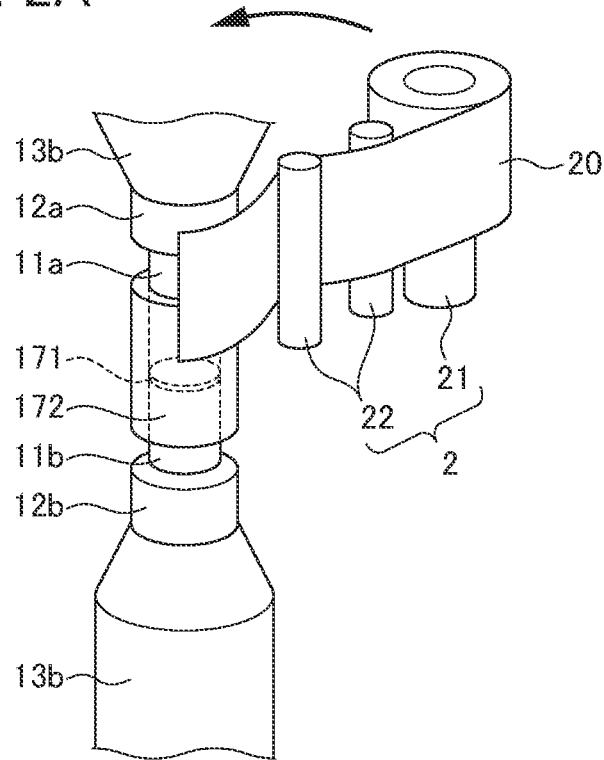
FIGS. 2A and 2B are diagrams for explaining a winding device for winding an insulating tape around the connection portion of the power cable.
Figure 2B:
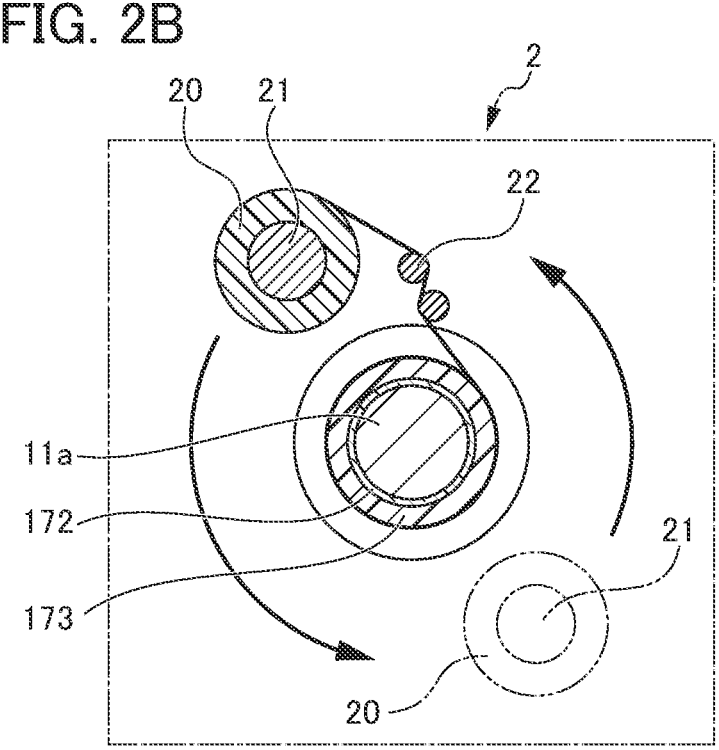

When winding the insulating tape, it is desirable to wind the tape with sufficient tension, so that air does not enter between layers of the tape. To wind the insulating tape by applying sufficient tension, it is possible to use a winding device 2 as shown in FIGS. 2A and 2B, which has a tape guide 22 for guiding the insulating tape 20 to the winding position (not shown) of the outer surface of the connection portion 171. By this winding device 2, the insulating tape 20, which is drawn from a reel 21, is wound and stacked through the tape guide 22 around the outer periphery of the internal semiconductive layer 172 formed on the outer surface of the connection portion 171, and around the exposed internal semiconductive layers 12a and 12b of the power cables 10a and 10b. Therefore, by revolving the winding device 2 around the conductor 11, it is possible to wind the insulating tape while applying tension to the insulating tape. However, with the winding device 2 of this type, due to contact between the insulating tape 20 and the tape guide 22, an additive such as an antioxidant which has been adhered due to bleeding out from the inside of the insulating tape 20 onto the surface is scraped by the tape guide 22, and adhered to and accumulated on the tape guide 22. When the amount of the additive accumulated on the tape guide 22 exceeds a certain level, the additive tends to adhere to the surface of the insulating tape 20 and be entrained in the insulating coating 173. Herein, the adhesion and accumulation of the additive tends to easily occur, when the surface temperature of the tape guide 22 increases due to friction or the like.

According to the present invention, even when the additive having adhered to the tape guide 22 adheres to the surface of the insulating tape 20 which passes through the tape guide 22, and the insulating tape 20 to which the additive is adhered is wound, thereby the additive being entrained in the insulating coating 173, it is possible to make the polyethylene reabsorb the additive by subsequent heating. However, the surface temperature of the tape guide 22 is preferably adjusted to 30° C. or less, and more preferably adjusted to 25° C. or less, since it is possible to reduce bleeding out onto the polyethylene, and this further reduces cracking to the fused portion of the insulating tape 20.

Herein, as a means for adjusting the surface temperature of the tape guide 22 is not particularly limited, but it is possible to use, for example, air cooling by applying cold air to the tape guide 22, or to install a heat sink.

(Formation of External Semiconductive Layer)

Figure 1E:
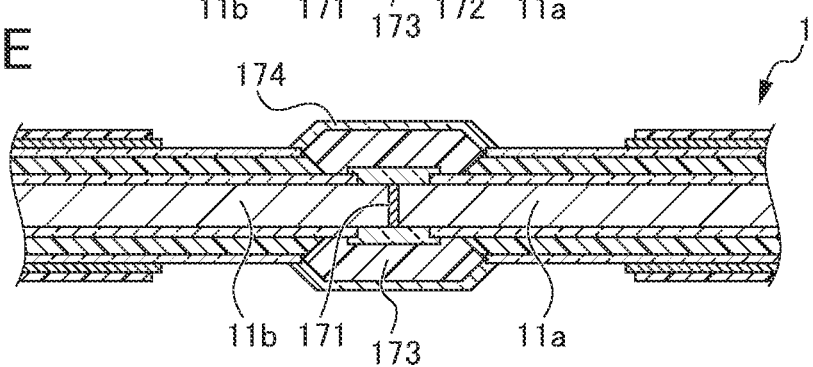

Around the insulating coating 173 formed by winding the insulating tape 20, an external semiconductive layer 174 may be formed, as shown in FIG. 1E. The external semiconductive layer 174 is formed of a semiconductive resin composition likewise to the internal semiconductive layer 172.

The external semiconductive layer 174 can be obtained, for example, by molding a resin, similarly to the internal semiconductive layer 172. Alternatively, the external semiconductive layer 174 may be formed as follows: a heat-shrinkable tube for forming the external semiconductive layer is inserted in advance into either the power cable 10a or 10b before the connection portion 171 is formed; then the internal semiconductive layer 172 and the insulating coating 173 are formed sequentially around the outer periphery of the connection portion 171; then the tube is moved to the outer peripheral position of the connection portion 171; and then the tube is heated so as to shrink.

(Preheating Step)

It is preferred to perform a preheating step of heating the connection portion 171, in which the insulating coating 173 and further the external semiconductive layer 174, as required, have been formed, to a temperature of 40° C. or more and 130° C. or less. This heats the insulating tape 20 before crosslinking, so that the additive such as an antioxidant bled onto the surface of the insulating tape 20 is easily reabsorbed by the polyethylene, and thus, it is possible to further reduce cracking to the fused portion of the insulating tape 20.

The heating temperature in the preheating step is preferably 40° C. or more, and more preferably 50° C. or more, in order to promote reabsorption of the additive into the polyethylene. On the other hand, the heating temperature in the preheating step is preferably 130° C. or less, and more preferably 120° C. or less from the viewpoint of preventing the polyethylene from crosslinking before the bled additive is reabsorbed.

The heating time in the preheating step is preferably 1 minute or more, and more preferably 3 minutes or more, in consideration of the time required for the additive to be reabsorbed by the polyethylene. On the other hand, the upper limit of the heating time in the preheating step is not particularly limited, but may be, for example, 10 minutes or less from the viewpoint of productivity.

(Crosslinking Step)

Then, the connection portion 171 in which the insulating coating 173 has been formed is subjected to pressurizing and heating treatment at a pressure of 300 kPa or more and 1,000 kPa or less at a temperature of 140° C. or more and 280° C. or less, to crosslink the polyethylene contained in the insulating coating 173. Thereby, the additive such as an antioxidant bled onto the surface of the insulating tape 20 is reabsorbed by the polyethylene, and additionally is crosslinked by the action of the crosslinking agent contained in the adjacent insulating tape 20. Therefore, cracking to the insulating coating 173, particularly to a fused portion of the insulating tape 20 can be reduced. Further, by crosslinking the polyethylene, it is possible to enhance mechanical properties and heat resistance of the resin material constituting the insulating coating 173.

In the crosslinking step, a portion in which the insulating tape 20 is wound is sealed in a pressure vessel, and pressurizing and heating treatment is performed in a state in which the pressure vessel is filled with a gas to pressurize, whereby a volatile low molecular weight compound which would be gasified by heating is absorbed by the resin material. At this time, the pressure during performing the pressurizing and heating treatment is preferably 300 kPa or more, and more preferably 400 kPa or more. In addition, from the viewpoint of preventing breakage of a sealed portion of the pressure vessel, the pressure during performing the pressurizing and heating treatment is preferably 1,000 kPa or less.

The heating temperature during performing the pressurizing and heating treatment in the crosslinking step is preferably 140° C. or more, and more preferably 160° C. or more, in order to promote crosslinking reaction by the action of the crosslinking agent. On the other hand, the heating temperature during performing the pressurizing and heating treatment in the crosslinking step is preferably 280° C. or less, and more preferably 260° C. or less from the viewpoint of preventing thermal decomposition of the polyethylene.

(Formation of Metal Shielding Layer and Anticorrosive Sheath)

A metal shielding layer and an anticorrosive sheath (both not shown) may be provided around the insulating coating 173 after crosslinking. As the metal shielding layer, for example, a metal shield layer made of lead, copper, or aluminum can be used. Further, as the anticorrosive sheath, those made of, for example, vinyl chloride, polyethylene, or nylon can be used.

<Power Cable>

Figure 3A:
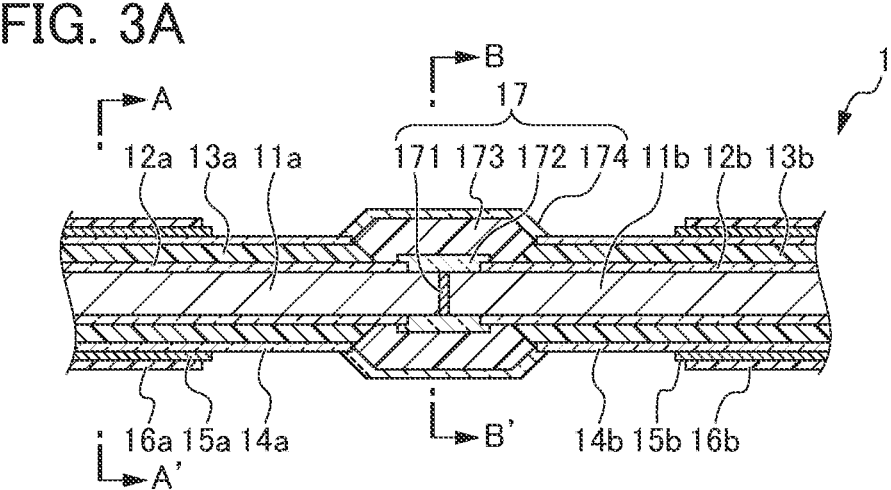
FIGS. 3A to 3C are diagrams for explaining the power cable according to the present invention and the connection portion thereof.

The power cable 1 as described in the present embodiment can be obtained, for example, by the method described above and has a connecting structure portion 17 including a connection portion 171 and an insulation coating 173, as shown in FIG. 3A: the connection portion 171 being obtained by conductor-connecting end portions of a plurality of power cables whose conductors 11a and 11b are exposed to each other, and the insulation coating 173 being formed by at least winding the insulating tape around the outer periphery of the connection portion 171 directly or indirectly via the internal semiconductive layer 172, followed by crosslinking.

Figure 3B:
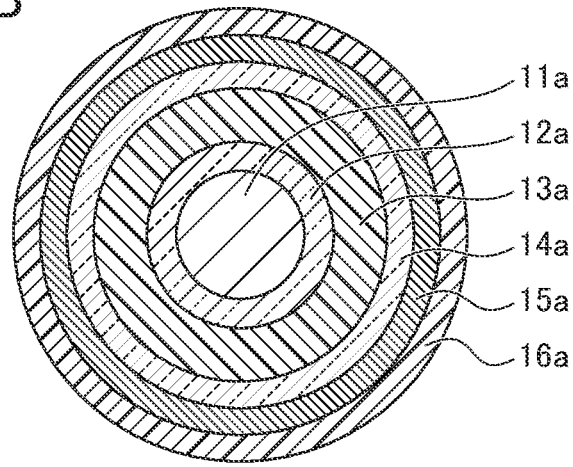
Figure 3C:
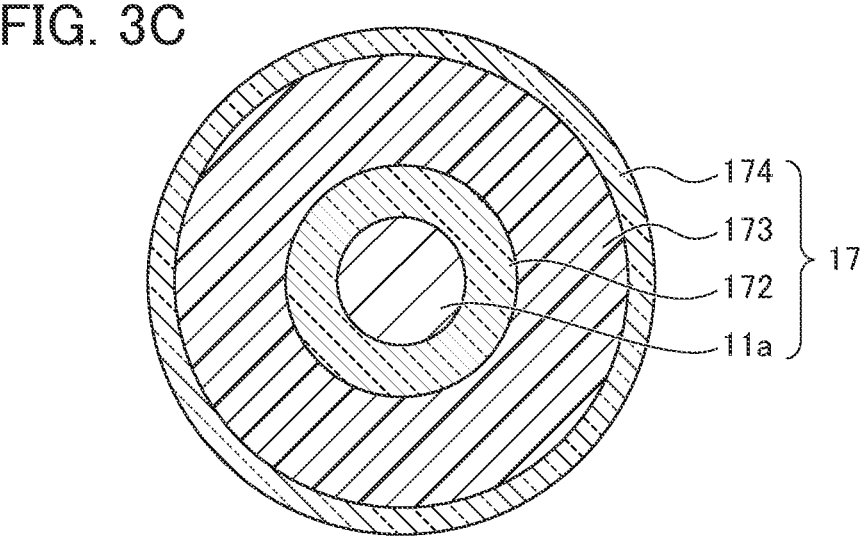

As shown in FIG. 3B, this power cable 1 is a power cable obtained by connecting a plurality of power cables 10a and 10b, the power cable 10a including the internal semiconductive layer 12a, the insulating layer 13a, the external semiconductive layer 14a, the metal shielding layer 15a, and the sheath 16a stacked in this order in the outer periphery of the conductor 11a. Further, it is preferable that in the outer periphery of the connection portion 171, for example, the internal semiconductive layer 172, the insulating coating 173, and the external semiconductive layer 174 are stacked in this order as shown in FIG. 3C, and these constitute the connecting structure portion 17.

The power cable 1 as described in the present embodiment can enhance heat aging resistance of the insulating coating 173 and also makes it possible for local cracking in the fused portion of the insulating tape to not easily occur, therefore achieving both durability to withstand long-term use as a CV cable, and stability of the insulation.

EXAMPLES

Next, the Examples and the Comparative Examples will be described in order to further clarify the effect of the present invention, but the present invention is not limited to these Examples.

Example 1

(Preparation of Material and Kneading Step)

As the polyethylene (A), 5 parts by mass of maleic anhydride-modified polyethylene "SCONA TSPE 1112 GALL" (manufactured by BYK Japan, melting point: 115 to 132° C., specific gravity: 0.89 to 0.94) which is modified polyethylene (A1) and 95 parts by mass of low-density polyethylene "ZF30R" (manufactured by Japan Polyethylene Corporation, melting point: 110° C., specific gravity: 0.92) which is unmodified polyethylene (A2) were used, and the sum of these contents was set to 100 parts by mass.

To 100 parts by mass of polyethylene (A), 0.2 parts by mass of a phosphorus-based antioxidant "Irgafos P-EPQ" (tetrakis(2,4-di-tert-butylphenyl)-biphenylene diphosphonite, molecular weight 1035, manufactured by BASF) and 0.2 parts by mass of phenol-based antioxidant "Irganox 1330" (2,4,6-tris(3',5'-di-tert-butyl-4'-hydroxybenzyl)mesitylene, molecular weight 775, manufactured by BASF) as the antioxidant (B) were mixed under dry condition, and then melt-kneaded at a kneading temperature of 120° C. for 10 minutes to pelletize.

To the obtained pellets, 1.7 parts by mass of "Percumyl D" (dicumyl peroxide (DCP), manufactured by NOF Corporation), which is a crosslinking agent (C), was mixed at room temperature. Then, the temperature of the mixing apparatus was set to 90° C. and the mixture was mixed for 10 minutes, so that the DCP was absorbed by the pellets to obtain a resin material (melting point 110° C.)

(Molding Step)

The obtained resin material was subjected to a molding step using an inflation method. More specifically, a film was formed by extruding the resin material from a die at 130° C., so that a film thickness was 100 μm. Thereafter, the resulting film was subjected to slitting so that the tape width was 20 mm, to obtain insulating tapes.

(Formation of Insulation Coating on Power Cable)

An end portion of each of two power cables 10a and 10b (conductor cross-sectional area: 2,000 mm$^2$; thickness of each of internal and external semiconductive layers: 1 mm; thickness of insulating coating: 15 mm) having an insulating layer having the same composition as the insulating tape, was cut to a substantially conical shape, and the conductors 11a and 11b in the end portions were exposed as shown in FIG. 1A. The exposed conductors 11a and 11b were placed, so as to face each other, and the end portions of the conductors 11a and 11b were conductor-connected by welding, to form the connection portion 171, as shown in FIG. 1B.

Then, a tape made of a semiconductive resin was wound around a portion where the conductor was exposed, to form the internal semiconductive layer 172 having a thickness of 1 mm, as shown in FIG. 1C, and the insulating tape described above was wound around to form an insulating coating 173 having a thickness of 20 mm, as shown in FIG. 1D. When winding the insulating tape, the winding device 2 having a tape guide 22 was used, as shown in FIGS. 2A and 2B, and the surface temperature of the tape guide 22 was kept 25° C. or less by blowing cold air to the tape guide 22.

Herein, when forming the connection portion 171 by conductor-connecting the conductors 11a and the 11b, a heat-shrinkable tube, which was made of a semiconductive resin having a thickness of 1 mm and which was for forming an external semiconductive layer, was inserted in advance into either the power cable 10a or the power cable 10b, the internal semiconductive layer 172 and the insulating coating 173 were sequentially formed on the periphery of the connection portion 171, then the tube was moved to the outer peripheral position of the connection portion 171, and then the tube was heated to shrink, so that the external semiconductive layer 174 was formed.

The connection portion 171 in which the insulating coating 173 and the external semiconductive layer 174 were formed was preheated for 10 minutes at a temperature of 80° C. or more and 100° C. or less in the air. Thereafter, the polyethylene was crosslinked by performing pressurizing and heating treatment for 3 hours at a pressure of 800 kPa and a temperature of 220° C. in a nitrogen atmosphere, to obtain a power cable joined.

Example 2

An insulating tape was prepared in the same manner as in Example 1, except that as the polyethylene (A), 30 parts by mass of maleic anhydride-modified polyethylene, "SCONA TSPE 1112 GALL" (manufactured by BYK Japan, melting point: 115 to 132° C., specific gravity: 0.89 to 0.94) which is modified polyethylene (A1), and 70 parts by mass of low-density polyethylene "ZF30R" (manufactured by Japan Polyethylene Corporation, melting point: 110° C., specific gravity: 0.92) which is unmodified polyethylene (A2) were used and the sum of the modified polyethylene and the unmodified polyethylene was set to 100 parts by mass. The obtained insulating tape was used for insulating coating, when joining power cables.

Example 3

An insulating tape was prepared in the same manner as in Example 1, except that as the polyethylene (A), 5 parts by mass of ethylene-methacrylic acid copolymer "Himilan 1705Zn" (manufactured by DuPont-Mitsui Polychemicals Co., Ltd., methacrylic acid content: 15% by mass, melting point: 91° C., specific gravity: 0.95) which is modified polyethylene (A1) and 95 parts by mass of low-density polyethylene "ZF30R" (manufactured by Japan Polyethylene Corporation, melting point: 110° C., specific gravity: 0.92) which is unmodified polyethylene (A2) were used and the sum of the modified polyethylene and the unmodified polyethylene was set to 100 parts by mass. The obtained insulating tape was used for insulating coating, when joining power cables.

Examples 4 to 13, Comparative Examples 1 to 6

Insulating tapes were prepared in the same manner as in Example 1, except that the type and content of the antioxidant (B), the content of the crosslinking agent (C), the tape thickness of the insulating tape, the maximum temperature of the tape guide surface in the winding device for the insulating tape, and the presence or absence of preheating were changed as in Tables 1 and 2. The obtained tapes were used for insulating coating when connecting (joining) power cables.

[Evaluation]

Using the insulating tapes and the power cables according to the above Examples and Comparative Examples, characteristics were evaluated as shown below. The evaluation conditions for each characteristic are as follows. Results are shown in Table 1 and Table 2.

[1] Resin Cracking

With respect to resin cracking of insulating coating made of an insulating tape, a connecting structure portion of a power cable was cut in a round slice of 10 mm wide, and the conductor was removed to obtain an observation sample. When this sample was heated at 130° C. for 1 hour, a crystallized portion of the insulator polyethylene was amorphized, and thereby transparency was increased. Therefore, a resin crack inside the observation sample could be visually observed as a white streak. With respect to the power cables of the Examples and Comparative Examples, the total number of resin cracks in five observation samples was counted. The total number of resin cracks is preferably 5 or less with respect to the five observation samples.

[2] Aging Retention Rate

To investigate durability in long-term use of the insulating coating made of the insulating tape, an aging retention rate was measured. Herein, the aging retention rate was measured in the following manner: pieces of insulating tape were superimposed and subjected to pressurizing and heating treatment at a temperature of 220° C. over 30 minutes, while pressing at a pressure of 980 kPa using a molding machine to crosslink polyethylene to obtain a sheet having a thickness of 1 mm. The obtained sheet was punched into dumbbell type 3 and five tensile test specimens were obtained. With respect to the thus-obtained five test specimens, tensile test was performed at a tensile speed of 200 mm/min, and the average value of the five test specimens was adopted as a tensile strength before aging (N/mm$^2$). Five test specimens similarly molded from the sheet were aged by heating for 48 hours at 160° C. in the air, then a tensile test was performed in the same manner as described above, and the average value of the five test specimens was adopted as a tensile strength after aging (N/mm$^2$). The rate of the "tensile strength after aging" to the "tensile strength before aging" was calculated as a percentage (%), and this rate was defined as the "aging retention rate" which indicates a degree of resin aging by heating. Since it is preferable that the tensile strength does not decrease, even when the resin is aged, and therefore the "aging retention rate" is preferable to have a larger numerical value, and more preferable to have a value of 80° or more.

TABLE 1

| | | | Example 1 | Example 2 | Example 3 | Example 4 | Example 5 | Example 6 | Example 7 |
|---|---|---|---|---|---|---|---|---|---|
| Composition of resin material (parts by mass) | (A) Polyethylene | | | | | | | | |
| | (A1) Modified polyethylene | SCONA TSPE 1112 GALL | 5 | 30 | | 5 | 5 | 5 | 5 |
| | | Himilan 1705 Zn | | | 5 | | | | |
| | (A2) Low-density polyethylene | ZF30R | 95 | 70 | 95 | 95 | 95 | 95 | 95 |
| | Total of (A) | | 100 | 100 | 100 | 100 | 100 | 100 | 100 |
| | (A1) Content of unmodified polyethylene (A2) to 1 part by mass of modified polyethylene (A1) | | 19.0 | 2.3 | 19.0 | 19.0 | 19.0 | 19.0 | 19.0 |
| | (B) Antioxidant | | | | | | | | |
| | Phosphorus-based antioxidant | Irgafos P-EPQ (molecular weight: 1035) | 0.2 | 0.2 | 0.2 | | | 0.05 | 0.1 |
| | Phenol-based antioxidant | Irgarox 1330 molecular weight: 775) | 0.2 | 0.2 | 0.2 | | | | 0.1 |
| | | Nocrac 300 molecular weight: 359) | | | | 0.3 | | | |
| | | Sumilizer BHT (molecular weight: 220) | | | | | 0.4 | | |
| | | Irganox 1010 (molecular weight: 1178) | | | | | | | |
| | | Butyl hydroxyanisole (molecular weight: 180) | | | | | | | |
| | Total of (B) | | 0.4 | 0.4 | 0.4 | 0.3 | 0.4 | 0.05 | 0.2 |
| | (C) Crosslinking agent | | | | | | | | |
| | Crosslinking agent | Percumyl D (DCP) | 1.7 | 1.7 | 1.7 | 1.7 | 1.7 | 0.5 | 1.7 |
| | Content of antioxidant (B) to 100 parts by mass of crosslinking agent (C) | | 23.5 | 23.5 | 23.5 | 17.6 | 23.5 | 10.0 | 11.8 |
| Production conditions | Tape thickness [µm] | | 100 | 100 | 100 | 100 | 100 | 100 | 100 |
| | Maximum temperature (° C.) of tape guide surface | | 25 | 25 | 25 | 25 | 25 | 25 | 25 |
| | Presence or absence of preheating | | Present | Present | Present | Present | Present | Present | Present |
| Evaluation result | Number of resin cracks | | 0 | 0 | 1 | 0 | 0 | 0 | 0 |
| | Aging retention rate (%) | | 83 | 86 | 81 | 83 | 80 | 81 | 80 |

| | | | Example 8 | Example 9 | Example 10 | Example 11 | Example 12 | Example 13 |
|---|---|---|---|---|---|---|---|---|
| Composition of resin material (parts by mass) | (A) Polyethylene | | | | | | | |
| | (A1) Modified polyethylene | SCONA TSPE 1112 GALL | 5 | 5 | 5 | 5 | 5 | 5 |
| | | Himilan 1705 Zn | | | | | | |
| | (A2) Low-density polyethylene | ZF30R | 95 | 95 | 95 | 95 | 95 | 95 |
| | Total of (A) | | 100 | 100 | 100 | 100 | 100 | 100 |
| | (A1) Content of unmodified polyethylene (A2) to 1 part by mass of modified polyethylene (A1) | | 19.0 | 19.0 | 19.0 | 19.0 | 19.0 | 19.0 |
| | (B) Antioxidant | | | | | | | |
| | Phosphorus-based antioxidant | Irgafos P-EPQ (molecular weight: 1035) | 0.3 | 0.4 | 0.2 | 0.2 | 0.2 | 0.2 |
| | Phenol-based antioxidant | Irgarox 1330 molecular weight: 775) | 0.3 | 0.4 | 0.2 | 0.2 | 0.2 | 0.2 |
| | | Nocrac 300 molecular weight: 359) | | | | | | |

TABLE 1-continued

|  |  |  |  |  |  |  |  |  |
|---|---|---|---|---|---|---|---|---|
|  |  | Sumilizer BHT (molecular weight: 220) |  |  |  |  |  |  |
|  |  | Irganox 1010 (molecular weight: 1178) |  |  |  |  |  |  |
|  |  | Butyl hydroxyanisole (molecular weight: 180) |  |  |  |  |  |  |
|  |  | Total of (B) | 0.6 | 0.8 | 0.4 | 0.4 | 0.4 | 0.4 |
|  | (C) Crosslinking agent |  |  |  |  |  |  |  |
|  | Crosslinking agent | Percumyl D (DCP) | 1.7 | 3 | 1.7 | 1.7 | 1.7 | 1.7 |
|  |  | Content of antioxidant (B) to 100 parts by mass of crosslinking agent (C) | 35.3 | 26.7 | 23.5 | 23.5 | 23.5 | 23.5 |
| Production conditions |  | Tape thickness [μm] | 100 | 100 | 250 | 50 | 100 | 100 |
|  |  | Maximum temperature (° C.) of tape guide surface | 25 | 25 | 25 | 25 | 30 | 25 |
|  |  | Presence or absence of preheating | Present | Present | Present | Present | Present | Absent |
| Evaluation result |  | Number of resin cracks | 0 | 1 | 0 | 0 | 4 | 3 |
|  |  | Aging retention rate (%) | 90 | 96 | 83 | 81 | 82 | 84 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Composition of resin material (parts by mass) | (A) Polyethylene |  |  |  |  |  |  |  |
|  | (A1) Modified polyethylene | SCONA TSPE 1112 GALL | 5 | 5 | 5 | 5 | 5 | 5 |
|  | (A2) Low-density polyethylene | Himilan 1705 Zn ZF30R | 95 | 95 | 95 | 95 | 95 | 95 |
|  | Total of (A) |  | 100 | 100 | 100 | 100 | 100 | 100 |
|  | (A1) Content of unmodified polyethylene (A2) to 1 part by mass of modified polyethylene (A1) |  | 19.0 | 19.0 | 19.0 | 19.0 | 19.0 | 19.0 |
|  | (B) Antioxidant |  |  |  |  |  |  |  |
|  | Phosphorus-based antioxidant | Irgafos P-EPQ (molecular weight: 1035) |  |  | 0.01 | 0.5 | 0.2 | 0.2 |
|  | Phenol-based antioxidant | Irganox 1330 (molecular weight: 775) |  |  | 0.01 | 0.5 | 0.2 | 0.2 |
|  |  | Nocrac 300 (molecular weight: 359) |  |  |  |  |  |  |
|  |  | Sumilizer BHT (molecular weight: 220) |  |  |  |  |  |  |
|  |  | Irganox 1010 (molecular weight: 1178) | 0.4 |  |  |  |  |  |
|  |  | Butyl hydroxyanisole (molecular weight: 180) |  | 0.4 |  |  |  |  |
|  | Total of (B) |  | 0.4 | 0.4 | 0.02 | 1 | 0.4 | 0.4 |
|  | (C) crosslinking agent |  |  |  |  |  |  |  |
|  | Crosslinking agent | Percumyl D (DCP) | 1.7 | 0.0 | 1.7 | 1.7 | 1.7 | 1.7 |
|  | Content of antioxidant (B) to 100 parts by mass of crosslinking agent (C) |  | 23.5 | — | 1.2 | 58.8 | 23.5 | 23.5 |
| Production conditions | Tape thickness [μm] |  | 100 | 100 | 100 | 100 | 280 | 30 |
|  | Maximum temperature [° C.] of tape guide surface |  | 25 | 25 | 25 | 25 | 25 | 25 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Evaluation result | Presence or absence of preheating | Present | Present | Present | Present | Present | Present |
|  | Number of resin cracks | 16 | 0 | 0 | 22 | 31 | 13 |
|  | Aging retention rate (%) | 89 | 66 | 65 | 96 | 81 | 82 |

(Note)
Underlines in the Table indicate those outside the appropriate range of the present invention and those In which evaluation results do not satisfy the passing level in the Examples of the present invention.

Details of each component used in the preparation of resin materials described in Table 1 and Table 2 are as follows.
[Polyethylene (A)]
Maleic anhydride-modified polyethylene "SCONA TSPE 1112 GALL" (manufactured by BYK Japan, melting point: 115 to 132° C., specific gravity: 0.89 to 0.94)
Ethylene-methacrylic acid copolymer "Himilan 1705Zn" (manufactured by DuPont-Mitsui Polychemicals Co., Ltd., melting point: 91° C., specific gravity: 0.95) which is modified polyethylene
Low-density polyethylene "ZF30R" (manufactured by Japan Polyethylene Corporation, melting point: 110° C., specific gravity: 0.92) which is unmodified polyethylene
[Antioxidant (B)]
Phosphorus-based antioxidant "Irgafos P-EPQ" (tetrakis (2,4-di-tert-butylphenyl)-biphenylene diphosphonite, molecular weight: 1035, manufactured by BASF)
Phenol-based antioxidant "Irganox 1330" (2,4,6-tris (3', 5'-di-tert-butyl-4'-hydroxybenzyl)mesitylene, molecular weight 775, manufactured by BASF)
Phenol-based antioxidant "Nocrac 300" (4,4'-thiobis(3-methyl-6-t-butylphenol), molecular weight 359, manufactured by Ouchi Shinko Chemical Industrial)
Phenol-based antioxidant "Sumilizer BHT" (butyl hydroxytoluene, molecular weight 220, manufactured by Sumitomo Chemical Co., Ltd.)
Phenol-based antioxidant "Irganox 1010" (pentaerythritol=tetrakis [3-(3',5'-di-tert-butyl-4'-hydroxyphenyl)propionate], molecular weight 1178, manufactured by BASF)
Phenol-based antioxidant (butylhydroxyanisole, molecular weight 180)
[Crosslinking Agent (C)]
Crosslinking Agent "Percumyl D" (Dicumyl Peroxide (DCP), Manufactured by NOF Corporation)
From the evaluation results of Table 1 and Table 2, it was confirmed that the insulating tapes of Examples 1 to 13 which included the modified polyethylene (A1), the antioxidant (B), and the crosslinking agent (C) and in which the molecular weight and content of the antioxidant (B) and the tape thickness were within the appropriate ranges of the present invention had a total number of resin cracks of 5 or less and the aging retention rate of 80% or more.

From the above results, it was confirmed that the insulating tapes of Examples 1 to 13 had high durability against long-term use, and that resin cracking hardly occurred when the insulating coatings were formed.

In contrast, in the insulating tape of Comparative Example 1, the molecular weight of the antioxidant (B) had a large value of 1,050 or more, and therefore numerous resin cracks occurred in the insulating coating formed from the insulating tape of Comparative Example 1, thus the insulating tape of Comparative Example 1 failed to satisfy the passing level in this point.

In addition, in the insulating tape of Comparative Example 2, the molecular weight of the antioxidant (B) had a small value of less than 190 and the crosslinking agent (C) was not contained, and therefore the aging retention rate was low, thus the insulating tape of Comparative Example 2 failed to satisfy the passing level in terms of durability against long-term use.

Further, in the insulating tape of Comparative Example 3, the content of the antioxidant (B) was a small amount of less than 0.05 parts by mass, and therefore the aging retention rate was low, thus the insulating tape of Comparative Example 3 failed to satisfy the passing level in terms of durability against long-term use.

Further, in the insulating tape of Comparative Example 4, the content of the antioxidant (B) was a large amount exceeding 0.8 parts by mass, and therefore, numerous cracks occurred in the insulating coating formed from the insulating tape, thus the insulating tape of Comparative Example 4 failed to satisfy the passing level.

Further, in the insulating tapes of Comparative Examples 5 and 6, the tape thicknesses were outside the range of 50 μm or more and 250 μm or less, and therefore numerous cracks occurred in the insulating coatings formed from the insulating tapes, thus the insulating tapes of Comparative Examples 5 and 6 failed to satisfy the passing level.

EXPLANATION OF REFERENCE NUMERALS 1, 10a, and 10b: Power cable
11, 11a, and 11b: Conductors
12, 12a, and 12b: Internal semiconductive layers
13a and 13b: Insulating layers
14a and 14b: External semiconductive layers
15a and 15b: Metal shielding layers
16a and 16b: Sheaths
17: Connecting structure portion
171: Connection portion
172: Internal semiconductive layer
173: Insulating coating
174: External semiconductive layer
2: Winding device
20: Insulating tape
21: Reel
22: Tape guide

The invention claimed is:
1. An insulating tape comprising:
a resin material comprising
polyethylene at least partially modified by a molecule imparting hydrophilicity,
an antioxidant, and
a crosslinking agent,
wherein the antioxidant has a molecular weight in a range of 190 or more and less than 1050, wherein the antioxidant has a content in a range of 0.05 parts by mass or more and 0.8 parts by mass or less with respect to 100 parts by mass of the polyethylene, wherein the insulating tape has a thickness in a range of 50 μm or more and 250 μm or less, wherein the antioxidant includes at least one selected from the group consisting of a phosphorus-based antioxidant, a sulfur-based antioxidant, an amine-based antioxidant, a hydrazine-based antioxidant and an amide-based antioxidant, and a derivative thereof, where the sulfur-based antioxidant has a molecular weight of 400 or more and 1000 or less.

2. The insulating tape according to claim 1, wherein the molecule imparting hydrophilicity is at least one selected from the group consisting of unsaturated dicarboxylic acids, anhydrides of unsaturated dicarboxylic acids, and derivatives of unsaturated dicarboxylic acids.

3. A method for forming an insulating coating on an outer surface of a connection portion of a power cable, comprising:

winding the insulating tape according to claim 2 around an outer periphery of a connection portion in which end portions of a plurality of power cables whose conductors are exposed are conductor-connected to each other, to form the insulating coating on the outer surface of the connection portion; and crosslinking the polyethylene in the insulating coating by subjecting the connection portion having the insulating coating formed thereon to pressurizing and heating treatment of 300 kPa or more and 1,000 kPa or less at a temperature of 140° C. or more and 280° C. or less.

4. A power cable, comprising a connecting structure portion comprising:

a connection portion in which end portions of a plurality of power cables whose conductors are exposed are conductor-connected to each other, and an insulating coating formed on an outer periphery of the connection portion by at least winding the insulating tape according to claim 2 around the outer periphery of the connection portion and performing crosslinking.

5. A method for forming an insulating coating on an outer surface of a connection portion of a power cable, comprising:

winding the insulating tape according to claim 1 around an outer periphery of a connection portion in which end portions of a plurality of power cables whose conductors are exposed are conductor-connected to each other, to form the insulating coating on the outer surface of the connection portion; and crosslinking the polyethylene in the insulating coating by subjecting the connection portion having the insulating coating formed thereon to pressurizing and heating treatment of 300 kPa or more and 1,000 kPa or less at a temperature of 140° C. or more and 280° C. or less.

6. The method for forming an insulating coating on an outer surface of a connection portion of a power cable according to claim 5, wherein in the tape winding step, a winding device having a tape guide for guiding the insulating tape to a winding position on the outer surface of the connection portion is used, and the tape winding is performed while controlling a surface temperature of the tape guide during winding the insulating tape to 30° C. or less.

7. The method for forming an insulating coating on an outer surface of a connection portion of a power cable according to claim 5, the method further comprising a preheating step of heating the connection portion, around which the insulation coating is formed, at 40° C. or more and 130° C. or less after the tape winding step and before the crosslinking step.

8. The method for forming an insulating coating on an outer surface of a connection portion of a power cable according to claim 6, the method further comprising a preheating step of heating the connection portion, around which the insulation coating is formed, at 40° C. or more and 130° C. or less after the tape winding step and before the crosslinking step.

9. A power cable, comprising a connecting structure portion comprising:

a connection portion in which end portions of a plurality of power cables whose conductors are exposed are conductor-connected to each other, and an insulating coating formed on an outer periphery of the connection portion by at least winding the insulating tape according to claim 1 around the outer periphery of the connection portion and performing crosslinking.

10. The insulating tape according to claim 1, wherein the polyethylene includes modified polyethylene and does not include unmodified polyethylene.

11. The insulating tape according to claim 1, wherein the polyethylene includes unmodified polyethylene and modified polyethylene in a ratio of 2.3:1 to 2:1.

* * * * *